United States Patent
Augunas et al.

[11] 3,727,943
[45] Apr. 17, 1973

[54] OCCUPANT RESTRAINT SYSTEM

[75] Inventors: Algis G. Augunas, Royal Oak; James C. Louton, Jr., Bloomfield Hills; Roman Rafalik, Warren, all of Mich.

[73] Assignee: General Motors Corporation, Detroit, Mich.

[22] Filed: May 18, 1971

[21] Appl. No.: 144,470

[52] U.S. Cl. ............................................280/150 SB
[51] Int. Cl. ..............................................B60r 21/02
[58] Field of Search ...............................280/150 SB

[56] References Cited

UNITED STATES PATENTS

| | | | |
|---|---|---|---|
| 2,852,270 | 9/1958 | Hunt | 280/150 SB |
| 2,858,144 | 10/1958 | Oppenheim | 280/150 SB |
| 3,411,602 | 11/1958 | Royce | 280/150 SB X |
| 3,506,083 | 4/1970 | Botnick et al. | 280/150 SB X |
| 3,583,726 | 6/1971 | Lindblad | 280/150 SB |

*Primary Examiner*—Leo Friaglia
*Attorney*—W. E. Finken and Herbert Furman

[57] ABSTRACT

An occupant restrain system for a vehicle body which includes a door movable between open and closed positions and mounting a door lock engageable with a striker on the body for holding the door in closed position. The lock is of the uncoupling type and includes inside and outside release handles connected to an operating lever which is selectively coupled to an uncoupled from the detent for the bolt. A restraint belt includes a lap belt mounted at one end on the floor pan inboard of the seated occupant and a shoulder belt mounted at one end on the seat back or on the roof panel inboard of the seated occupant. The other ends of the belts are integrally or otherwise connected to each other at a belt juncture. A pulley arrangement interconnects the belt juncture and the door for moving the belt juncture forwardly upon opening movement of the door and permitting rearward movement thereof upon closing movement of the door. The belt juncture is also secured to one end of an outboard belt, the other end of which is secured to a belt retractor mounted on the door adjacent the outboard side of the seat cushion. The retractor includes a belt anchoring reel having ratchet end plates, and a pawl which is normally spring biased into engagement with the end plates to block movement of the reel in a belt extending direction. A control lever is movable into engagement with a pawl extension to move the pawl to released position. The lock operating lever is fixed to one end of a shiftable cable, the other end of which is connected to one end of a second shiftable cable, the other end of which is fixed to the retractor control lever. Movement of the lock operating lever by either release handle shifts the first and second cables and the control lever to release the pawl. A third shiftable cable is connected to the second cable and to the lock bolt. Upon movement of the bolt to unlatched position, the third cable shifts the second cable to also release the pawl of the retractor. The connections between the second cable and the first and third cables permit movement of the second cable by either independently of the other.

5 Claims, 4 Drawing Figures

PATENTED APR 17 1973

3,727,943

INVENTORS
*Algis G. Augunas,*
*James C. Louton Jr. &*
BY *Roman Rafalik*
*Herbert Furman*
ATTORNEY

PATENTED APR 17 1973

INVENTORS
Algis G. Augunas,
James C. Louton, Jr. &
BY Roman Rafalik

Herbert Furman
ATTORNEY

OCCUPANT RESTRAINT SYSTEM

This invention relates to occupant restraint systems and more particularly to a passive restraint system including control means controlling release of a belt retractor lock means in accordance with the operating condition of a vehicle body door lock to provide for movement of a restraint belt to unrestrained positions while the occupant remains seated or enters or leaves the vehicle.

Passive occupant restraint systems are well known. Generally such systems locate a restraint belt in restrained position when the occupant is seated and locate the belt in unrestrained position when the occupant enters or leaves the vehicle.

The control means of this invention is of particular use in passive type systems including a belt retractor controlling movement of the restraint belt to unrestrained position. The control means permit the occupant to freely move within the vehicle if he so desires and also to freely enter and leave the vehicle. In its preferred embodiment, the control means includes a belt retractor which is continously biased in a belt retracting direction to bias the restraint belt to restrained position. Releasable lock means normally locks the belt retractor against belt extension and movement of the restraint belt to unrestrained position. The retractor lock means is released upon operation of either the release handles of the vehicle body door lock or upon disengagement of the lock bolt from its cooperating striker. The lock is of the uncoupling type, and when the release handles are uncoupled from the lock, operation of either handle releases the retractor lock means to permit belt extension relative to the retractor and movement of the restraint belt to an unrestrained position. This permits a seated occupant to actuate the inside handle and have freedom of movement within the vehicle while the door remains closed and locked. Upon release of the handle by the occupant, the restraint belt returns to restrained position as the retractor lock means again locks the restractor against belt extension. When the release handles are coupled to the lock, operation of either handle releases the door lock and the belt retractor lock means, and the disengagement of the bolt from the striker maintains the lock means released while the door remains open and the release handle is released. The restraint belt moves to an unrestrained position upon movement of the door to an open position to permit occupant ingress and egress. Closing movement of the door and engagement of the lock bolt with the striker permits the restraint belt to return to restrained position as the retractor lock means locks the retractor against belt extension.

One feature of this invention is that it provides an improved passive type occupant restraint system including a belt retractor controlling movement of a restraint belt to unrestrained position in accordance with the operating condition of a vehicle body door lock. Another feature is that the retractor is normally locked against belt extension movement and is released by operation of a release handle for the lock or by movement of the bolt of such lock to unlatched position. A further feature is that the retractor lock is released only during operation of the release handle while movement of the bolt to unlatched position maintains the retractor lock released.

These and other feature of this invention will be readily apparent from the following specification and drawings wherein.

Figure 1:
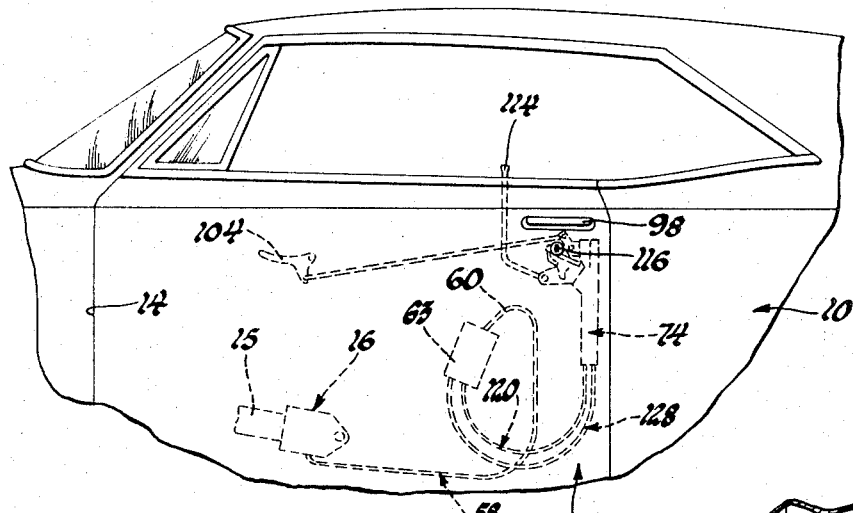
FIG. 1 is a partial side elevational view of a vehicle body embodying an occupant restraint system according to this invention.

Referring now particularly to FIG. 1 of the drawings, a vehicle body designated generally 10 includes a front door 12 which is hinged adjacent its forward edge 14 in a conventional manner to the body for movement between a closed position and an open position, not shown. The body 10 is conventional and includes a front seat, not shown, for the driver of the vehicle. Such seat may be of the bench or of the bucket type. A belt restraint system of the type shown in Ser. No. 144,524 (A-16,223) Fancy, filed May 18, 1971, now U.S. Pat. No. 3,694,002 and assigned to the assignee of this invention, is provided for the driver and includes lap and shoulder belts having their inboard ends respectively secured to the floor pan and to the seat or roof structure of the vehicle inboard of the driver seating position. If the seat is of the bucket type, the inboard belt ends will be mounted adjacent the seat cushion and seat back of such seat. If the seat is of the bench type, the inboard end of the lap belt may be mounted on the floor pan adjacent and below the seat cushion and extend forwardly through such seat cushion and seat back. The lap belt may be mounted either on the seat back or on the roof panel above the seat back.

The outboard ends of the lap and shoulder belt may be integrally connected or may be stitched or otherwise secured to each other. An outboard belt has one end secured to the lap and shoulder belts. If the outboard belt is retracted rearwardly of the body, it can be seen that the lap and shoulder belts will be moved rearwardly to restrained position with respect to the seated occupant. Likewise if the outboard belt is extended forwardly of the vehicle, the lap and shoulder belts will be moved forwardly to unrestrained position with respect to a seated occupant.

The outboard belt is extended forwardly of the vehicle by a pulley arrangement which includes a belt secured to the instrument panel and extending around a roller on the door and then around a roller on the instrument panel to the outboard belt or to the juncture of the lap and shoulder belts. Such an arrangement is shown in the aforenoted Fancy application. While a particular belt restraint system has been described, this invention is not limited to this system and may be used with other similar belt restraint systems.

Figure 2:
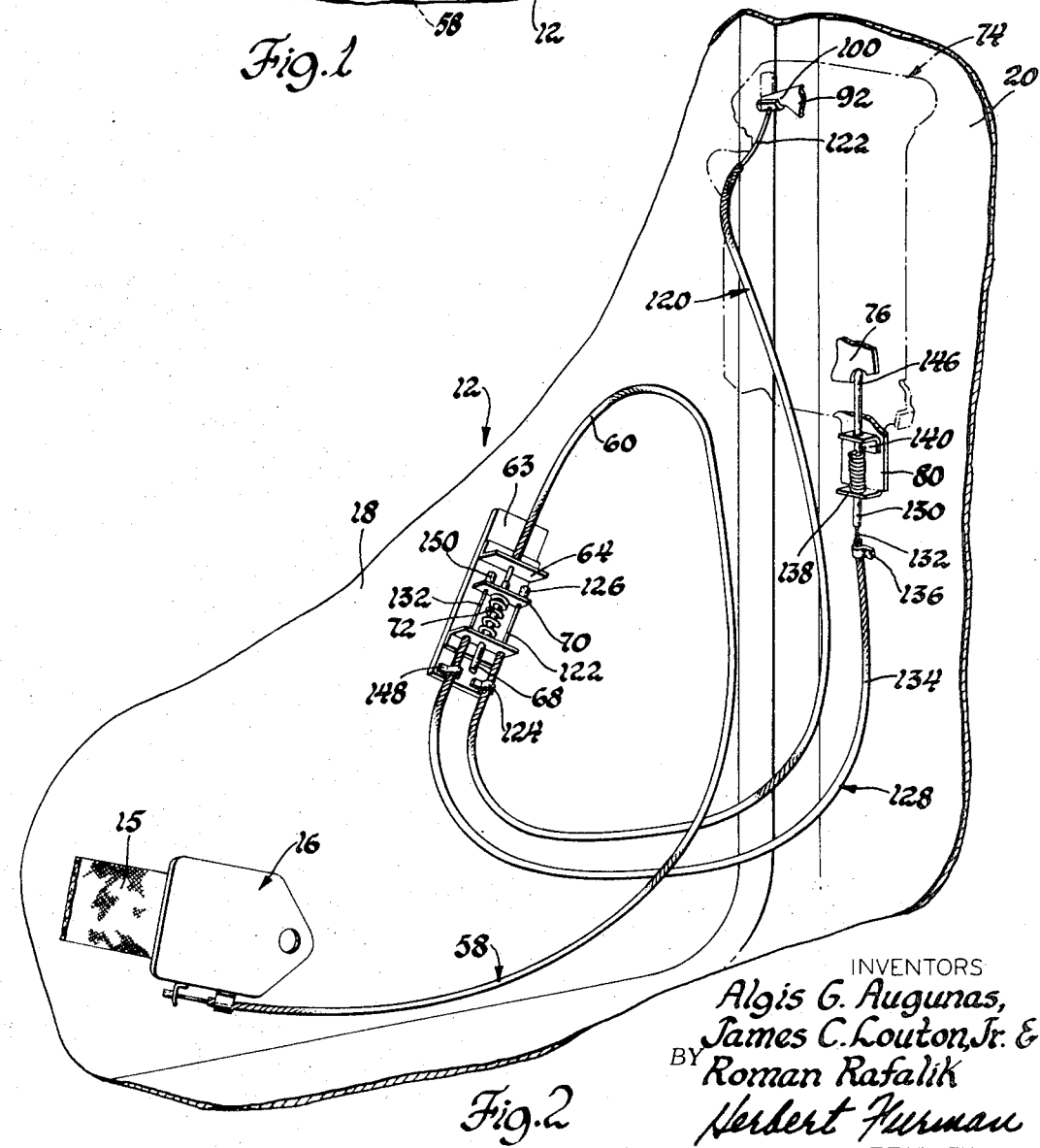
FIG. 2 is an enlarged broken away perspective view of a portion of FIG. 1.

In accordance with this invention, the other end of the outboard belt 15, FIG. 1, is secured to a belt retractor 16 for extension and retraction relative thereto. As shown in FIG. 2, retractor 16 is mounted on the inner panel 18 of the door 12 adjacent the rear wall or face 20 of the door. The retractor is located outboard of and adjacent the outboard side of the seat cushion of the front seat.

Figure 4:
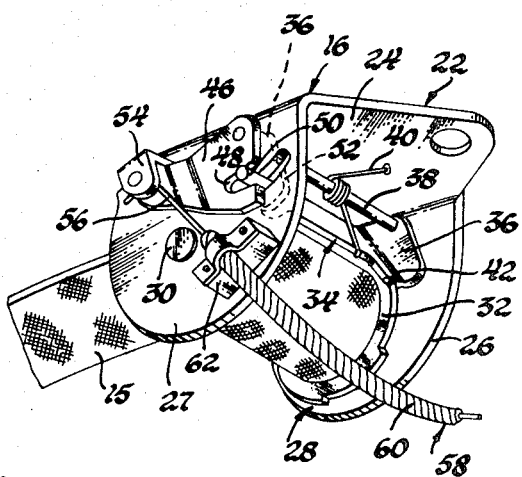
FIG. 4 is an enlarged perspective view of a portion of FIG. 2.

As shown in FIG. 4, the retractor 16 includes a generally U-shaped frame 22 having a base wall 24 and oppositely disposed side walls 26 and 27. The base wall 24 is suitably bolted or otherwise secured to the inner panel 18. Suitable reinforcements may be provided on the panel to accept the load from the retractor as required.

A reel 28 includes a shaft 30 journaled in aligned apertures in the walls 26 and 27 and a pair of like toothed end plates or ratchets 32 which are fixed to the shaft 30 adjacent the inboard sides of walls 26 and 27. A generally U-shaped pawl 34 has the aligned apertured lateral legs 36 thereof swingably mounted on a shaft 38 which extends between and is secured to the walls 26 and 27 of frame 22. A coil torsion spring 40 surrounds the shaft 38 and is hooked between the base wall 24 and the pawl 34 to continually bias the pawl 34 clockwise, as viewed in FIG. 4, and locate the longitudinally aligned shoulders 42 of such pawl in engagement with aligned shoulders of the toothed end plates 32 of the reel to normally block counterclockwise movement of such reel. The shaft 30 of the reel is conventionally secured to the other end of the outboard belt 15 of the restraint system. Extension of this belt to move the lap and shoulder belts to unrestrained position requires counterclockwise movement of the reel. This is normally blocked by the cooperating shoulders of the pawl and end plates. Although not shown, a conventional clock spring is connected between the shaft 30 and wall 26, on the outboard side of the wall, to continuously bias the reel 28 in a clockwise direction and thereby apply a continuous retracting force on the outboard belt 15 to normally locate the lap and shoulder belts in restrained position with respect to the driver.

A control lever 46 is pivoted on the shaft 38 outboard of wall 27 and includes an arcuate slot 48 generated about the axis of shaft 38 and normally freely receiving a pin 50. The pin 50 is secured to the left-hand lateral leg of pawl 34 and extends outwardly of wall 27 through an arcuate slot 52 formed therein about the axis of shaft 38.

A generally U-shaped extension 54 of lever 46 is secured to one end of the wire 56 of a Bowden cable 58. The one end of the sheath 60 of the cable is secured to a pillow block 62 conventionally mounted on the outboard side of wall 27 of frame 22.

As shown in FIG. 2, a support 63 is mounted on the inboard side of the door inner panel 18 in a conventional manner. A pair of spaced angle brackets 64 and 66 are secured to the support 63. The other end of the sheath 60 of cable 58 is conventionally secured to the bracket 64. A pin 68 is secured to the othe end of the wire 56 and is slidably received within the bracket 66. A plate 70 is fixed to the pin 68 intermediate the brackets 64 and 66. A coil compression spring 72 seats between the plate 70 and bracket 66 to normally bias the plate 70 upwardly and in turn bias the wire 56 of the Bowden cable 58 forwardly of he door 12 to normally locate the lever 46 in released position, as shown in FIG. 4.

Figure 3:
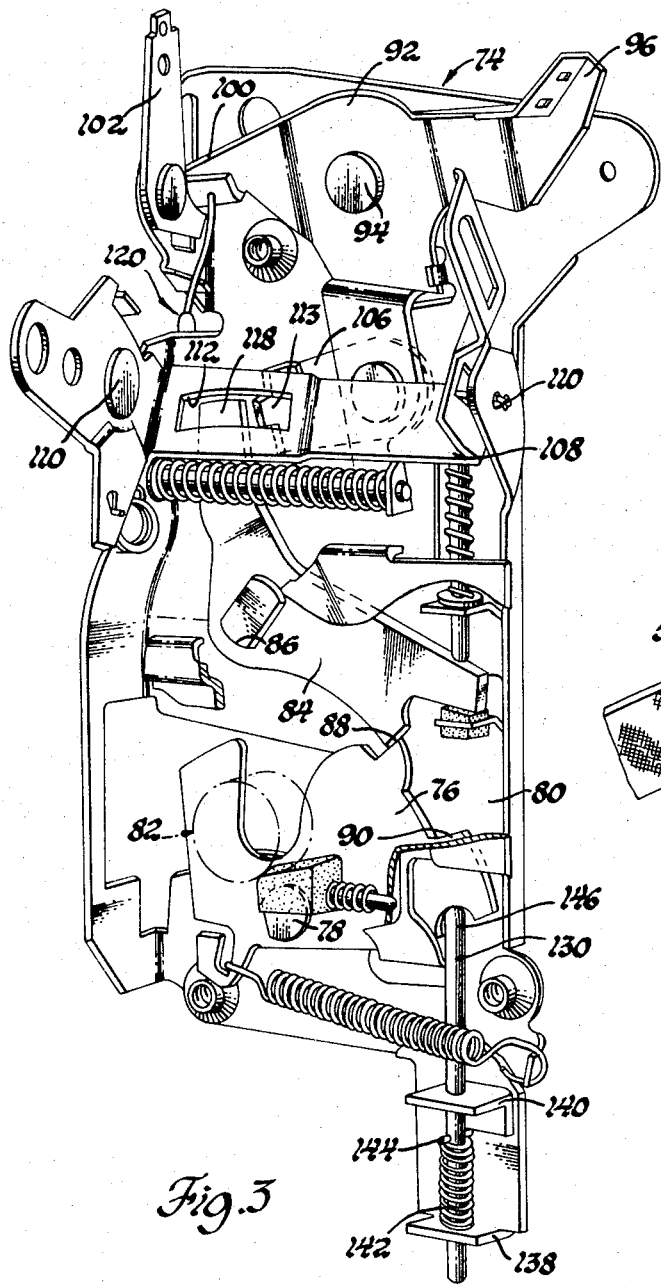
FIG. 3 is an enlarged perspective view of a portion of FIG. 1.

As schematically indicated in FIG. 1 and as shown in FIG. 3, a vehicle body door lock 74 is mounted on the rear wall or face 20 of door 12 to hold the door in closed position. The details of lock 74 form no part of this invention and reference may be had to copending application Ser. No. 84,763 Cockburn, filed Oct. 28, 1970, now U.S. Pat. No. 3,695,663 assigned to the assignee of this invention, for such details. Generally the lock is of the uncoupling type and includes a locking lever which is controlled by either an inside garnish button or an outside key cylinder assembly to selectively couple and uncouple an operating lever and the detent for the lock bolt. The operating lever is connected to both inside and outside release handles for release of the detent when the operating lever is coupled thereto.

Generally, as shown in FIG 3, the lock includes a fork type bolt 76 pivoted at 78 to the lock frame 80 for movement between a latched position as shown and an unlatched position counterclockwise thereof. When the bolt is in latched position, it engages the shank of a headed striker pin 82 which is conventionally mounted on the lock pillar of the body 10. A detent 84 pivoted to the lock frame at 86 is engageable with either a shoulder 88 or a shoulder 90 of the bolt to hold the bolt in latched position.

The operating lever 92 is pivoted at 94 to the lock frame. One end 96 of this lever is connected in a conventional manner to an outside release handle 98, FIG. 1. The other end 100 of the lever 92 overlies a leg of a bellcrank lever 102 which in turn is conventionally connected to an inside remote handle 104, FIG. 1. Operation of either handle 98 or 104 swings the lever 92 clockwise of the pivot 94. The lever 92 pivotally mounts an intermittent member 106 whose swingable position relative to the lever 92 is controlled by a locking lever 108 which is pivoted at 110 to the lock frame and includes a slot 112 receiving a lateral tab 113 of the intermittent member. The locking lever may be conventionally located in locked or unlocked position and is controlled either by an inside garnish button 114, FIG. 1, or an outside key cylinder assembly 116. The locking lever is shown in its unlocked position in FIG. 3, and it will be noted that the tab 113 of the intermittent member is in the path of a leg 118 of the detent 84 whereby clockwise movement of the lever 92 will release the detent from engagement with the shoulder 88 of the bolt 76 and permit the bolt to move counterclockwise to unlatched position. When the garnish button 114 or the key cylinder assembly 116 is operated to move the locking lever to its locked position, counterclockwise of its position shown, the tab 113 of member 106 is located out of the path of the leg 118 so that movement of the lever 92 does not release the detent 84 from the bolt and the lever 92 freewheels.

From the foregoing brief description, it can be seen that the lock 74 is of the uncoupling type and while a particular lock is shown, the invention is not limited to this particular lock but may be used with other known locks of the uncoupling type.

As shown in FIG. 2, a second Bowden cable 120 has one end of the wire 122 thereof secured to the end 100 of the lever 92. The one end of the sheath of this Bowden cable may be secured in any conventional manner to the lock frame. The other end of the sheath is secured by a bracket 124 to the support 63 and opens to an aperture in bracket 66. The wire 122 extends through the aperture of bracket 66 and through an aperture in the plate 70 and is provided with a fixed end cap 126. Movement of the wire 122 upwardly, as viewed in FIG. 2, upon clockwise movement of the lever 92 will shift the plate 70 downwardly. Likewise, the plate 70 may be moved downwardly independently of any movement of the wire 122.

A third Bowden cable 128 has a pin 130 fixed to one end of the wire 132 thereof. One end of the sheath 134 of this cable is secured by a bracket 136 to the wall 20 of door 12 below the lock 74. The pin 130 is slidably received within spaced brackets 138 and 40 on an extension of the frame 80 of lock 74. A coil compression spring 142 seats on the bracket 138 and on a pin 144, FIG. 3, staked to the pin 130 to continuously bias the pin 130 upwardly as viewed in FIGS. 2 and 3 and hold the pin in engagement with a notch 146 of bolt 76 when the bolt is in latched position as shown.

The other end of the sheath 134 is secured to the support 63 by a bracket 148 and opens to an aperture in bracket 66. The wire 132 extends through the aperture of bracket 66 and through an aperture in the plate 70, with the other end thereof being provided with a fixed end cap 150 which is the same as the cap 126. Movement of wire 132 upwardly, a viewed in FIG. 2, by spring 142 upon movement of bolt 76 to unlatched position moves plate 70 downwardly independent of any movement of wire 122. Likewise plate 70 can be moved downwardly by wire 122 independent of any movement of wire 132.

When the door is in a closed position and bolt 76 is in latched position as shown, the wires 122 and 132 have their respective end caps 126 and 150 located in engagement with the plate 70 under the action of the spring 72. The engagement of the plate 70 with these caps in turn locates the wire 56 within the sheath 60 to locate the lever 46 in its released position as shown in FIG. 4. Thus, the spring 40 biases the pawl 34 clockwise to locate the pawl shoulders 42 in engagement with aligned shoulders of the reel end plates 28 to block any movement of the reel in a belt extending direction while permitting movement thereof in a belt retracting direction under the action of the reel spring. Thus, the previously noted lap and shoulder belts will be moved rearwardly by belt 44 to restrained position in engagement with a seated occupant.

Assume now that the driver is seated on the front seat and operates the inside release handle 104 preparatory to leaving the vehicle. The lever 92 will be rotated clockwise, as viewed in FIG. 3, to engate tab 113 with leg 118 of the detent 84 and rotate the detent counterclockwise of pivot 86 to disengage the detent from the bolt shoulder 88 and permit the bolt to rotate counterclockwise to unlatched position. As lever 92 swings clockwise, wire 122 is shifted downwardly to move the plate 70 downwardly along wire 132 and against the action of the spring 72. In turn, the wire %' IS shifted upwardly and rotates the lever 46 counterclockwise, as viewed in FIG. 4, to engage the base of slot 48 with the pin 50. This rotates the pawl 34 counterclockwise as viewed in FIG. 4 to released position as the shoulders 42 thereof move out of engagement with the shoulders of the end plates 28. Reel 28 can now rotate counterclockwise in a belt extending direction. As the bolt starts to rotate counterclockwise to unlatched position, the action of the spring 142 on the pin 144 shifts the wire 132 upwardly, as viewed in FIG. 2, until pin 144 engages bracket 140. This moves the end cap 150 downwardly until it engages plate 70 and holds the plate in its downward position since spring 142 is stronger than spring 72. Thus, when the release handle is released, lever 46 holds pawl 34 in released position and the belt 44 is free to extend relative to the retractor against the action of the retractor spring. Accordingly, as the door moves to open position, the belt 44 will be extended as the lap and shoulder belts move forwardly to unrestrained position with respect to the driver to permit his egress from the body. When the driver thereafter closes the door 12, the movement of the bolt 76 from its unlatched position to its latched position in engagement with the striker 82 engages the notch 146 of the bolt with the pin 130 to move the pin 130 downwardly to its position shown in FIGS. 2 and 3. This shifts the wire 132 downwardly to move the end cap 150 upwardly and permit the plate 70 to move upwardly with the wire and end cap under the action of spring 72. The wire 122 will, of course, have returned to its position shown in FIG. 2 when the release handle is released by the driver. From the foregoing description, the operation of the system when the driver opens the door preparatory to entering the vehicle is believed evident.

Assume now that the door is in closed position, as shown, but that the locking lever 108 has been moved by the garnish button 114 to its unlocked position, wherein the tab 113 of the intermittent member 106 is no longer in the path of the detent leg 118. If the remote handle 104 is now operated, the lever 92 will again swing clockwise as previously set forth but the bolt 76 will remain in latched position. Movement of lever 92 moves the wire 122 upwardly and in turn moves the plate 70 downwardly against the action of spring 72 to release pawl 34. The pawl will remain released as long as the remote handle 104 is held by the operator. Thus, any time that the seated occupant wishes to move within the vehicle, he actuates the remote handle 104 and he then moves against the lap and shoulder belts as the belt 44 extends relative to the reel 16 against the action of the retractor spring. When the handle is released, the lap and shoulder belts are returned to restrained position as previously described.

To briefly summarize, this invention provides a belt retractor which is normally locked against belt extending movement. When an inside or outside lock release handle is coupled to the lock bolt and is actuated to disengage the bolt from the striker and open the door, the retractor is released so that a belt is freely extendible therefrom. As long as the lock remains in an unlatched condition, the retractor in turn remains unlocked.

Should the release handles be uncoupled from the bolt, they may be intermittently operated at will to temporarily release the retractor and permit free belt extension relative thereto.

Thus, this invention provides an improved occupant restraint system.

We claim:

1. In a vehicle body having a closure movable between open and closed positions with respect to a body opening and an adjacent occupant seat, latch means movable between latched and unlatched positions for selectively holding the closure in closed position or permitting movement thereof to open position, release means for releasing the latch means for movement to unlatched position, and means for selectively connecting and disconnecting the release means and latch means, the combination comprising, a restraint belt for the occupant seat, belt retractor means mounted on the closure, means operable to lock the retractor means against extension of the belt relative thereto, means controlled by the release means temporarily disabling the retractor lock means during temporary operation of the release means when disconnected from the latch means, and means controlled by the latch means disabling the retractor lock means upon movement of the latch means to unlatched position by the release means when connected thereto.

2. In a vehicle body having a closure movable between open and closed positions with respect to a body opening and an adjacent occupant seat, latch means movable between latched and unlatched positions for selectively holding the closure in closed position or permitting movement thereof to open position, release means for releasing the latch means for movement to unlatched position, and means for selectively connecting and disconnecting the release means and latch means, the combination comprising, a restraint belt for the occupant seat, belt retractor means mounted on the closure, means operable to lock the retractor means against extension of the belt relative thereto, means controlled by the release means disabling the retractor locking means during operation of the release means when disconnected from the latch means, and means controlled by the latch means maintaining the disabling of the retractor locking means upon movement of the latch means to unlatched position by the release means when connected thereto to permit belt extension as the closure moves to open position.

3. In a vehicle body having a closure movable between open and closed positions with respect to a body opening and an adjacent occupant seat, latch means movable between latchedand unlatched positions for selectively holding the closure in closed position or permitting movement thereof to open position, release means for releasing the latch means for movement to unlatched position, and means for selectively connecting and disconnecting the release means and latch means, the combination comprising, a restraint belt for the occupant seat, belt retractor means mounted on the closure, means normally operable to lock the retractor means against extension of the belt relative thereto, means controlled by the release means blocking normal operation of the retractor lock means during operation of the release means when disconnected from the latch means to permit belt extension when the closure is in closed position, and means controlled by the latch means blocking normal operation of the retractor lock means upon movement of the latch means to unlatched position by the release means when connected thereto to permit belt extension as the closure moves to open position.

4. In a vehicle body having a closure movable between open and closed positions with respect to a body opening and an adjacent occupant seat, latch means movable between latched and unlatched positions for selectively holding the closure in closed position or permitting movement thereof to open position, release means for releasing the latch means for movement to unlatched position, and means for selectively connecting and disconnecting the release means and latch means, the combination comprising, a restraint belt for the occupant seat, belt retractor means mounted on the closure and including a belt receiving reel movable in belt extending and retracting directions, means biasing the reel in a belt retracting direction, means normally operable to lock the reel against movement in a belt extending direction, means controlled by the release means disabling the reel lock means during operation of the release means when disconnected from the latch means to permit belt extension when the closure is in closed position, and means controlled by the latch means disabling the reel lock means upon movement of the latch means to unlatched position by the release means when connected thereto to permit belt extension as the closure moves to open position.

5. In a vehicle body having a closure member movable between open and closed positions with respect to a body member and an adjacent occupant seat, cooperating latch means and striker means on a respective member engageable and disengagable eith each other to selectively and alternately hold the closure member in closed position or permit movement thereof to open position, the combination comprising, a restraint belt for the occupant seat, belt retractor means mounted on the closure, means normahly operable to lock the retractor means against extension of the belt relative thereto, and means controlled by the latch means operable upon disengagement of the latch means and striker means to disable the retractor lock means and permit belt extension as the closure moves to open position.

* * * * *